United States Patent [19]

Tapscott

[11] Patent Number: 4,517,827
[45] Date of Patent: May 21, 1985

[54] APPARATUS AND METHOD FOR TESTING FOR LEAKAGES IN HERMETICALLY-SEALED PACKAGES

[75] Inventor: Donald A. Tapscott, Cobourg, Canada

[73] Assignee: General Foods Incorporated, Don Mills, Canada

[21] Appl. No.: 478,435

[22] Filed: Mar. 24, 1983

[51] Int. Cl.³ .............................................. G01M 3/36
[52] U.S. Cl. ...................................... 73/45.4; 73/49.3
[58] Field of Search ................ 73/45.4, 49.3; 209/530, 209/600

[56] References Cited

U.S. PATENT DOCUMENTS 3,441,132  4/1969  Browning .
3,751,972  8/1973  Hass ..................................... 73/45.4
3,837,215  9/1974  Massage ............................... 73/45.4
4,024,956  5/1977  Cassidy .
4,148,213  4/1979  Prakken ............................... 73/45.4

Primary Examiner—Stewart J. Levy
Assistant Examiner—Joseph W. Roskos
Attorney, Agent, or Firm—Thomas A. Marcoux; Richard D. Schmidt; Daniel J. Donovan

[57] ABSTRACT

An apparatus and a method for the continuous, non-destructive testing for leaks in generally hermetically-sealed, flexible packages, which is adapted to rapidly detect leakages in vacuum from a plurality of packages contained within a closed case, to ascertain the location of the defective package or packages within the case and to automatically divert the case containing the defective package to a location other than that receiving cases containing all acceptable packages.

23 Claims, 5 Drawing Figures

APPARATUS AND METHOD FOR TESTING FOR LEAKAGES IN HERMETICALLY-SEALED PACKAGES

BACKGROUND OF THE INVENTION

1. Field of the Invention

The present invention relates to an apparatus and to a method for the continuous, non-destructive testing for leaks in generally hermetically-sealed, flexible packages, and more particularly relates to an apparatus and method which is adapted to rapidly detect leakages in vacuum from a plurality of packages contained within a closed case, to ascertain the location of the defective package or packages within the case and to automatically divert the case containing the defective package to a location other than that receiving cases containing all acceptable packages.

2. Discussion of the Prior Art

A large assortment of commercially sold products are packaged in hermetically-sealed, flexible packages under an internal vacuum which is adapted to preserve the freshness and condition of the product over a considerable length of time when stored in warehouses and even when displayed in retail outlets. Among such products, particularly in the food industry, wherein a relatively long shelf life is required, may be coffee, products such as dry flavoring additives and other similar comestibles which, when exposed to the atmosphere for any appreciable period of time, will rapidly deteriorate or even decompose, and thereby rendered unsaleable. Consequently, in order to extend the shelf life of such products over lengthy periods of time, they are adapted to be packaged in socalled vacuum packs, or hermetically-sealed packages of impermeable material of a generally flexible nature, wherein the product and vacuum present within each package will impart a certain stiffness or rigidity to the package walls. However, such vacuum-packed flexible packages may occasionally develop leaks, possibly due to porosities in the packaging materials, or because of improper sealing upon evacuation of the packages subsequent to filling thereof with product. Generally, a defective package which is subject to leakage will allow most of the leakage, possibly up to 98% of the vacuum in the package to be detected within a short period of a few hours after the sealing of the package, and in many instances the leakage or defective package can be even detected within minutes of the packaging and sealing procedures.

Although numerous apparatuses and methods have been developed in the packaging industry for detecting leakages, in a non-destructive manner, in flexible hermetically-sealed packages which are under a vacuum or internal pressure, the prior art fails to provide an automatic apparatus for the rapid leakage testing of vacuum-packed flexible packages, and to be able to divert such defective packages in an automatic manner from a series of advancing cases each containing a plurality of the vacuum-packed flexible packages.

Thus, the different kinds of apparatuses and methods which are presently employed in the non-destructive testing of hermetically-sealed packages, particularly in the food industry, do not contemplate the provision of an automatic system for detecting "soft" packages or, in essence, packages subject to leakage, which are located within closed cases adapted to be conveyed to a leakage testing apparatus and in which leaking or defective packages can be detected and identified practically instantaneously, and the case containing the defective package or packages be automatically diverted to a specific location, whereas cases containing all properly hermetically-sealed, and non-leaking packages are conveyed along for palletizing and shipping.

Cassidy U.S. Pat. No. 4,024,956 discloses a method and an apparatus for detecting leaks in flexible packages which are conveyed in sequence along a predetermined linear feed path. In this instance, the packages are subjected to the weights of rollers which, if the rollers are displaced beyond a predetermined extent due to the package being too soft as a result of a leakage of vacuum from the package, a signal will be triggered to indicate the presence of leakage in that package and to allow the package to be manually removed from the continuous package flow. There is no provision in this prior art method and apparatus for the simultaneous leakage testing of a plurality of flexible packages which are arranged within a case and for automatically removing a case containing defective packages from a continuous conveyor feed system while facilitating the continued advance of tested cases which do not contain defective or leaking packages.

Prakken U.S. Pat. No. 4,148,213 discloses an apparatus for detecting and discarding sealed packages which are subject to leaks from a series of sequentially advancing product-filled sealed packages while being transported on a conveyor belt. In this prior art device, pressure is applied to the entire upper surface of the package and, responsive to downward displacement of a pressure piston beyond a predetermined distance, the defective package may then be laterally ejected by the action of a suitable blower arrangement from the path of conveyance of the packages into a reject bin or receptacle. There is no disclosure of an apparatus for the simultaneous testing for leakage of a plurality of vacuum-packed flexible package which are arranged within a closed case and for automatically diverting the case containing such defective packages from the normal flow or transport of further advancing cases containing only satisfactorily sealed packages.

Browning U.S. Pat. No. 3,441,132 relates to a system for detecting the presence or, alternatively, the absence of a required vacuum or pressure within hermetically-sealed containers, in which a wall segment of each container, while the container is being transported along a conveyor belt, is deflected by a magnetic field pulse and the resultant internal pressure-dependent dynamic displacement of the container wall is detected through the intermediary of an electrostatic sensor. An electrical signal generated by the sensor will indicate the presence (or absence) of internal pressure within the container and thereby allow for detection of any leakage therefrom. There is no provision of an automatic apparatus and method for detecting leakages in a non-destructive manner in a plurality of vacuum-sealed, flexible packages contained within a case and for diverting any such case from its normal path of conveyance upon the detection of defective packages therein.

Finally, Haas U.S. Pat. No. 3,751,972 discloses a leakage detector arrangement for testing a sealed container which is constituted of a semi-rigid or flexible material. Each container is individually placed into a pressurizable chamber and the physical container condition is sensed for the generating of a signal representative of the container dimension which would vary in response to the internal pressure present within the container.

This rather rudimentary apparatus is not adapted to be utilized in connection with an automatic system for simultaneously, non-destructively testing the "softness" or leakage of vacuum-packed flexible packages which are arranged within a case, and for automatically diverting cases containing any defective packages from a continuous flow of advancing cases.

In essence, none of the prior art publications provide for automatic equipment adapted to check the softness of flexible vacuum-sealed packages which are arranged within a closed case, and for automatically diverting the case with the defective package or packages therein from a conveyor system transporting cases containing all satisfactorily sealed packages.

SUMMARY OF THE INVENTION

Accordingly, the present invention contemplates the provision of an apparatus and method for the continuous, non-destructive testing for leakages from hermetically-sealed, packages which are under an internal vacuum, wherein a plurality of each of the packages are contained in a closed case incorporating relatively small apertures to permit probes of a sensor arrangement to contact each of the packages within the case and wherein indicator means are operatively connected with the sensor arrangement to produce signals representative of the sealed condition of each of the packages being contacted by the probes of the sensor arrangement. The signals may be adapted for visual readouts representative of the presence of a leak in one or more of the sealed packages contained within the case or, alternatively, provide a visual signal indicative of a satisfactory vacuum being present in each of the packages attesting to the absence of any leaks. The apparatus includes a plurality of vertically downwardly displaceable probes which are adapted to pass through the apertures provided in the case containing the flexible vacuum-sealed packages, each apertures being aligned with respectively one of the packages contained in the case, and wherein pressure is adapted to be applied by each of the probes against the surfaces of the packages. The presence of a required vacuum in each flexible package, which imparts a certain hardness to the package, will limit downward movement of each of the probes beyond a predetermined extent and cause a visual signal to be displayed on a display panel indicative of the absence of a leakage in any of the packages within the case currently subjected to the leakage test, and will effectuate the advance of the case containing the satisfactorily sealed packages to a further location for palletizing and shipment to a storage warehouse, or to a retail outlet.

The presence of one or more defective packages in a case, indicative in that the necessary vacuum is no longer present therein as a result of leakage, is effectuated in that the probe of the sensor arrangement which is in contact with that specific defective package will be displaced into the case to a greater extent because of the "softness" of the package, and cause a visual signal to be displayed on the display board representative of the presence and location of the leaking package within the case. Upon the detection by the apparatus of such a defective package within a case, if desired the apparatus may also trigger an audio signal to alert an operator. The case with the defective package or packages may be automatically diverted to a separate conveyor for the receipt of cases containing defective packages, enabling such cases to be removed, either automatically or manually, opened and the defective package removed therefrom for possible recycling of the product and/or replacement of the package.

Accordingly, it is a primary object of the present invention to provide an apparatus for the continuous, non-destructive testing of hermatically-sealed, vacuum-packed, flexible packages.

It is a more specific object of the present invention to provide an apparatus of the type described for the automatic continuous, non-destructive testing for leaks in hermetically-sealed, vacuum-packed flexible packages which are contained within a case, wherein probes of sensor devices will detect the presence or absence of a required vacuum within each sealed package so as to provide a display indicative of the packages within the case being in a satisfactorily vacuum-sealed condition or signals indicative of the presence of one or more packages in the case which are subject to leakages.

Still another object of the present invention is to provide an apparatus of the type described wherein cases each containing a plurality of the flexible vacuum-sealed packages are advanced to a predetermined station in the apparatus, the packages in each case are simultaneously tested for leakage a plurality of probes, and responsive to the sensed conditions of the packages in the cases are then advanced along a conveyor incorporating means for automatically diverting cases containing defective packages.

Yet another object of the present invention is to provide an apparatus of the type described wherein the apparatus provides for the display visual signals indicative of the presence and location of defective packages within each case or, alternatively, provides a visual signal indicative of the presence of satisfactorily sealed packages in the case thereby to automatically advance the case from the apparatus for palletizing and shipment.

A further object of the present invention resides in the provision of a method for simultaneously testing a plurality of flexible, vacuum-sealed packages contained within a case in a rapid and automatic manner through utilizing the apparatus as described herein.

It is a more specific object of the present invention to provide a method for automatically marking on the outside of a case containing the packages, the presence and location of a soft or defective package.

BRIEF DESCRIPTION OF THE DRAWINGS

The foregoing and other objects and advantages of the invention may be realized through the provision of a package testing apparatus as described in detail hereinbelow, taken in conjunction with the accompanying drawings in which.

DETAILED DESCRIPTION

Figure 1:
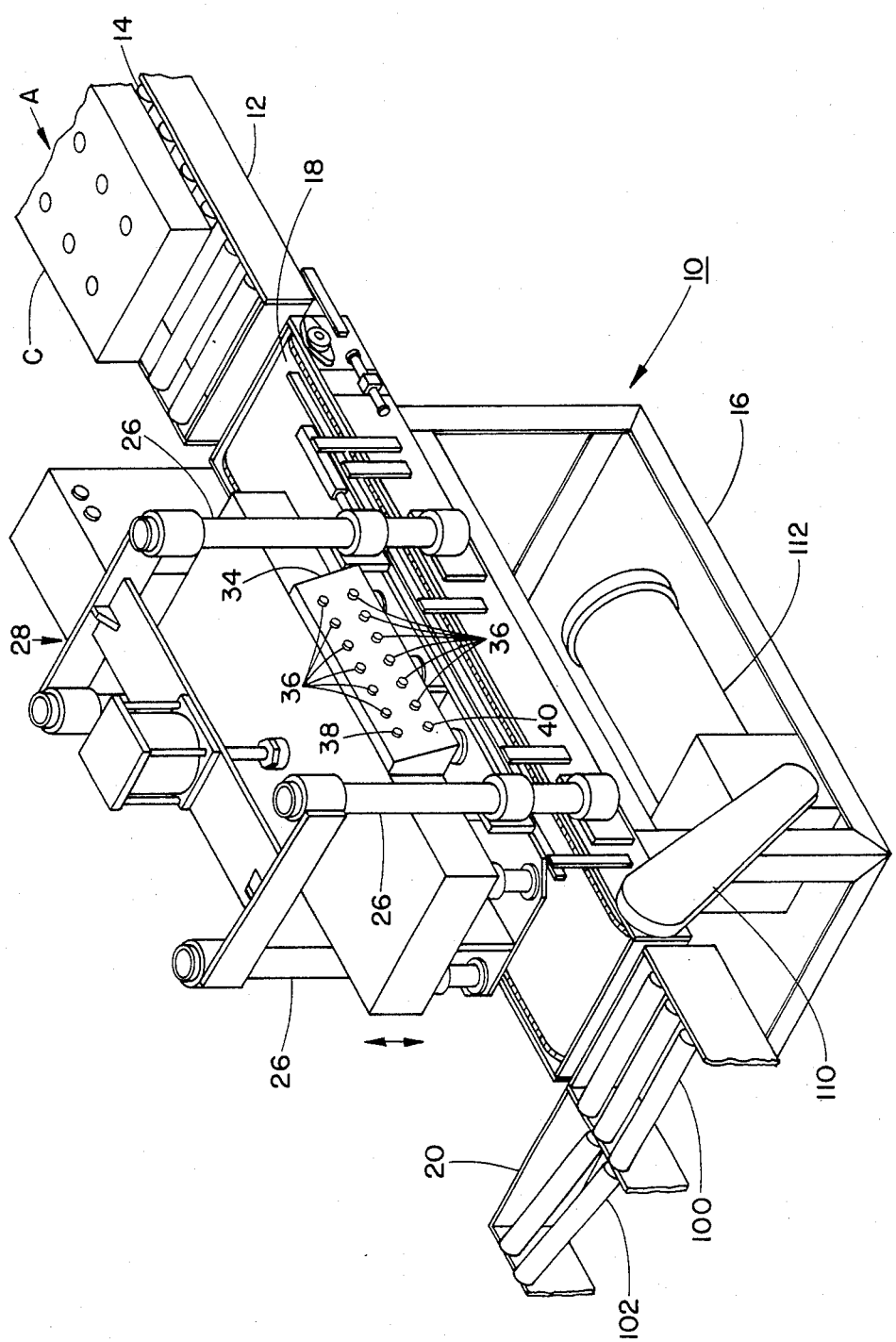
FIG. 1 illustrates a generally perspective view of an apparatus for the continuous, non-destructive leakage testing of hermetically-sealed, vacuum-packed flexible packages.

Referring now in detail to the drawings, shown in FIG. 1 is an apparatus 10 for the continuous, non-destructive testing for the presence of leaks in hermetically-sealed, flexible packages under an internal vacuum, and which is adapted to sequentially receive a series of contiguous cases C each containing a plurality of the flexible packages each containing a product, for example such as coffee, or the like. The cases C are transported in the direction of arrow A on and in feed conveyor 12 towards the leakage testing apparatus 10, with the conveyor 12 comprising a series of rollers 14 adapted to be driven through a suitable power drive (not shown).

The testing apparatus 10 incorporates a stationary or fixed frame structure 16, and includes a horizontal indexing conveyor belt 18, the upper run of which is substantially coplanar with or slightly below the level of the rollers 14 of the infeed conveyor 12, and is adapted to be indexed forwardly in the same direction as arrow A as described hereinbelow.

Figure 2:
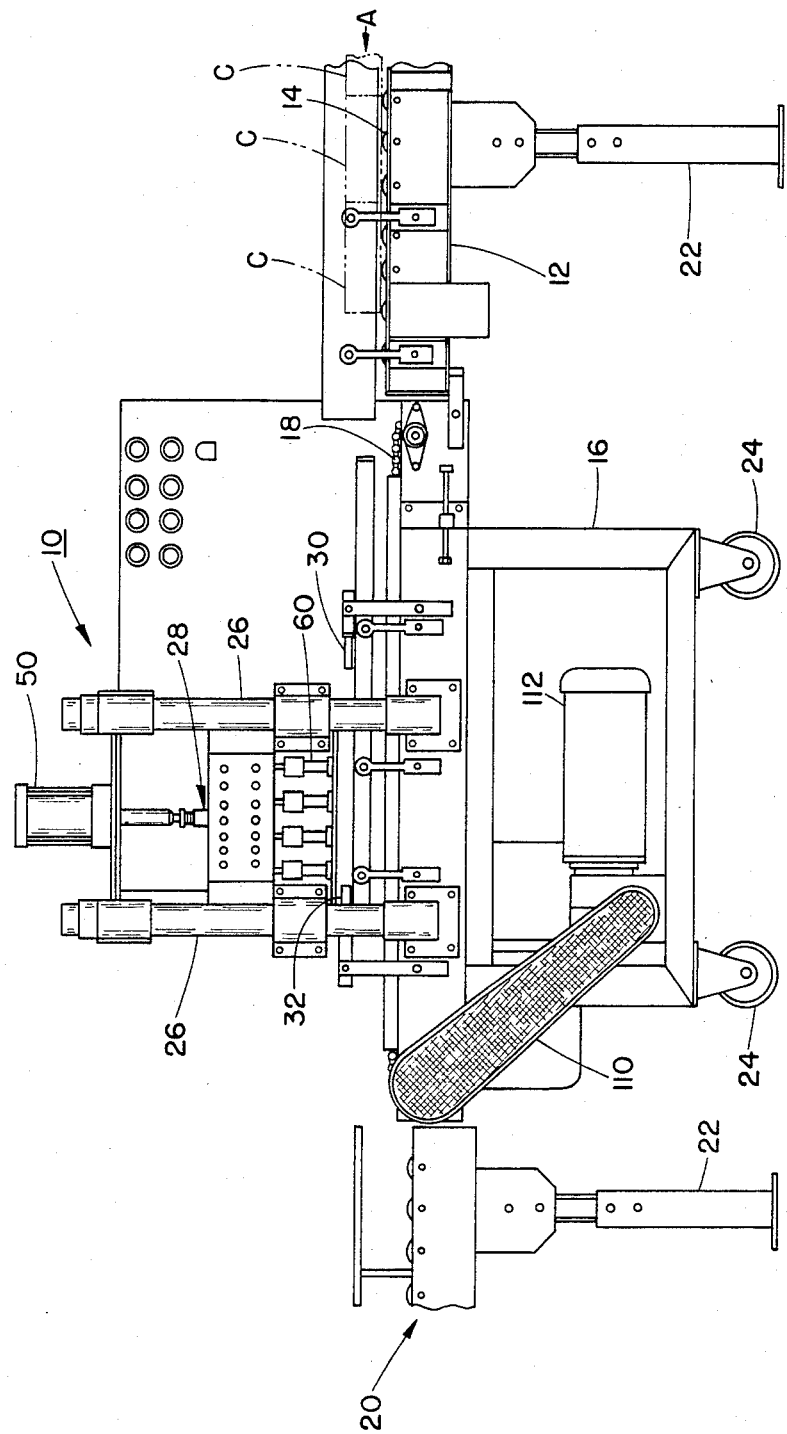
FIG. 2 is a front elevational view of the apparatus of FIG. 1 shown in a reduced scale.
Figure 3:
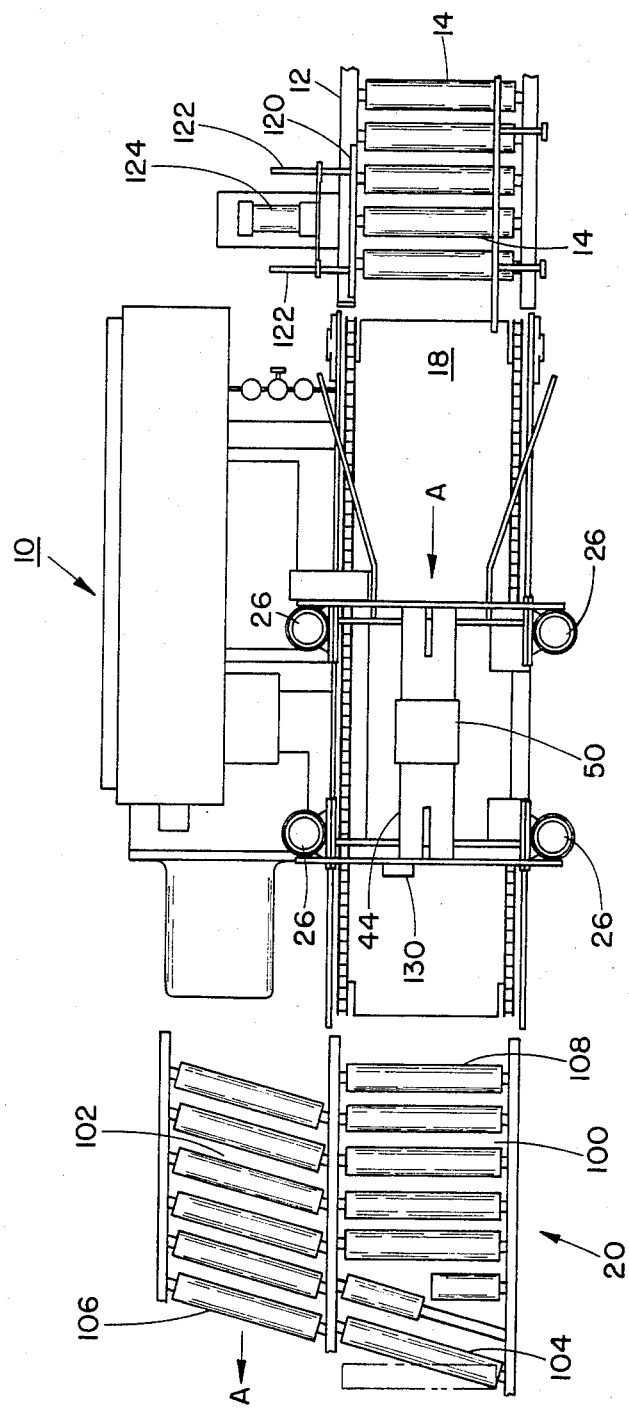
FIG. 3 is a top plan view of the apparatus of FIG. 2.

At the discharge end of the indexing conveyor 18, the latter communicates with a further roller conveyor arrangement 20 which is adapted to receive leakage-tested packages in cases C from the testing apparatus 10, and for conveying the cases C further along, as described in detail hereinbelow. As illustrated in FIGS. 2 and 3 of the drawings, the roller conveyors 12 and 20 may be in fixed location on the floor by means of upright columns 22 so as to form part of a continuous conveyor line of a packaging plant or warehouse, whereas the testing apparatus 10 may be removably positioned intermediate the conveyors 12 and 20 by being mounted on lockable casters 24. Alternatively, the apparatus 10 may also be arranged in a fixed position intermediate the roller conveyors 12 and 20 wherein the apparatus for testing leakages in the packages within the cases C is an integral section of an on-line leakage testing system.

Fastened to the stationary frame structure 16 of the apparatus 10 are four upright guide posts 26, two spaced respectively on each side of the indexing conveyor 18, and which are adapted to support a sensor head structure 28 for vertical movement towards and away from the indexing conveyor 18.

A first photocell unit 30 is arranged towards the inlet end of the indexing conveyor 18, while a second photoelectric cell unit 32 is positioned somewhat downstream of the sensor head unit 28.

The leakage testing apparatus 10 includes a display board or panel 34 having a plurality of indicator light locations thereon. The indicator light locations, in this instance, may include twelve light locations 36 for red lights indicative of the presence and locations of various defective, leaking packages in the cases C being tested, one amber light 38 indicative of the operational status of the apparatus 10, and one green light 40 indicative of all packages being in satisfactory non-leaking, hermetically-sealed condition.

Figure 4:
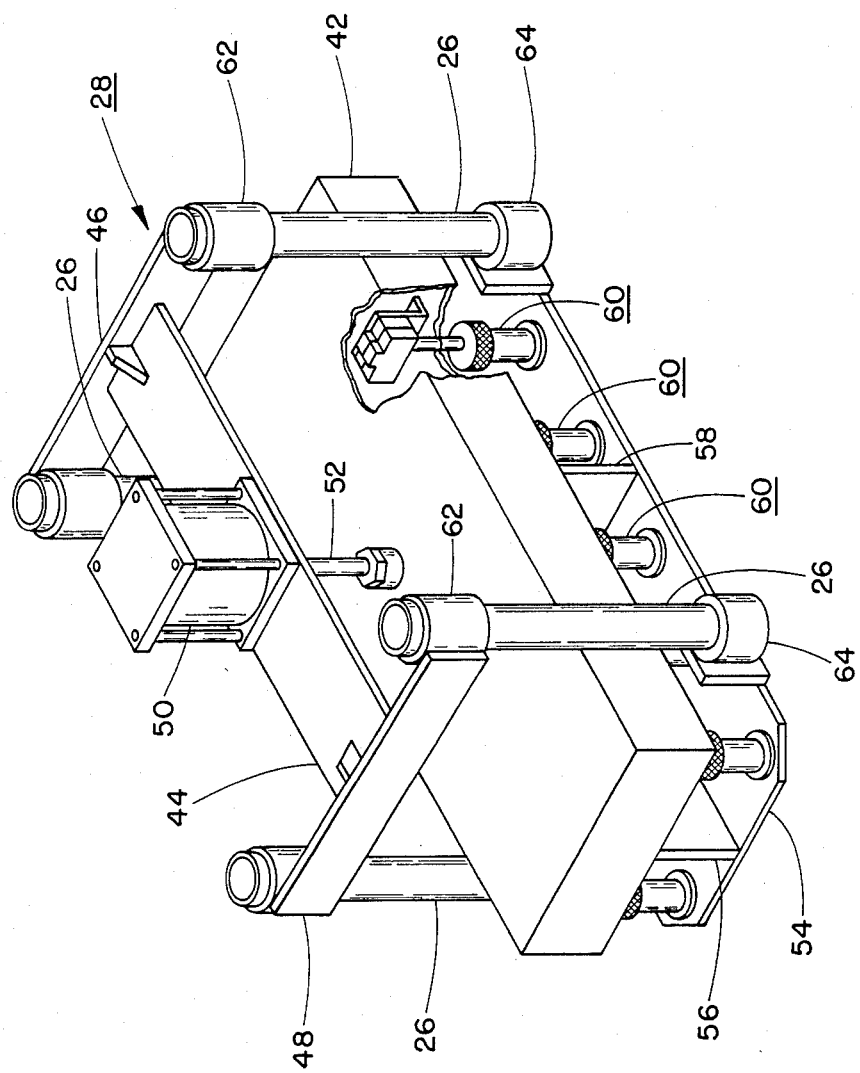
FIG. 4 is a perspective view of the sensor head structure of the testing apparatus.
Figure 5:
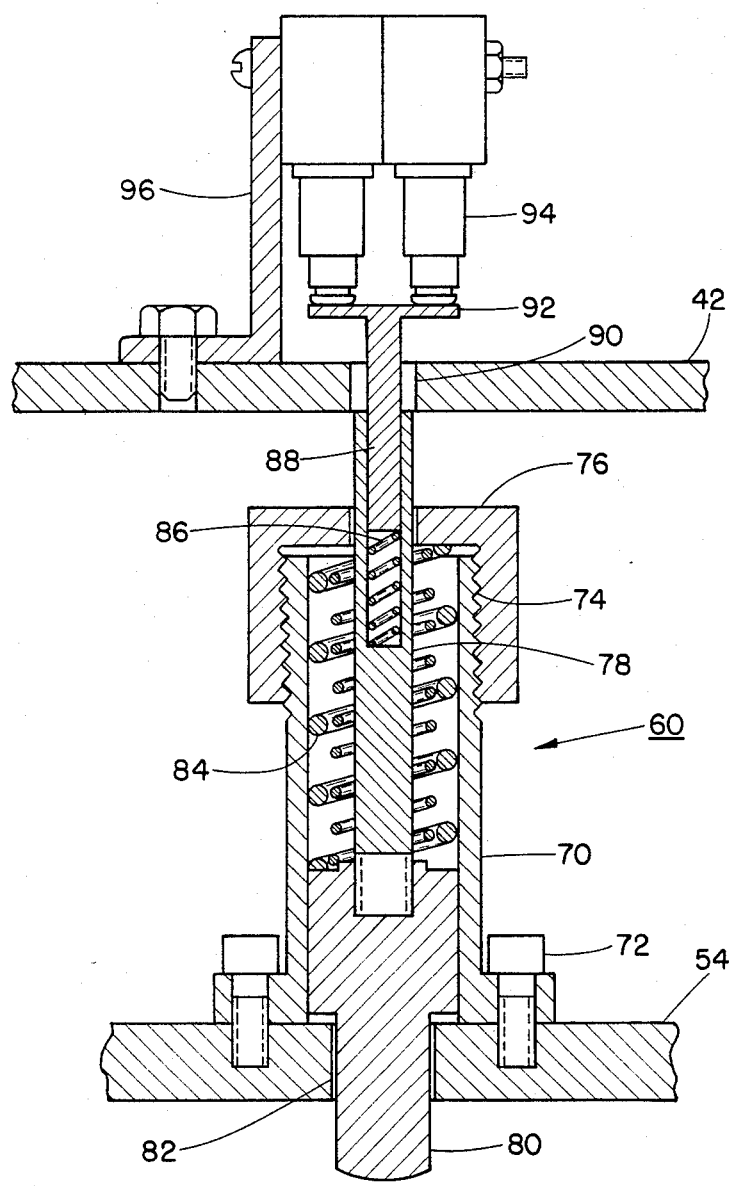
FIG. 5 is an enlarged sectional view of one probe of the sensor arrangement for testing a flexible package for leakage, as shown in FIG. 4 of the drawings.

The sensor head structure 28, as shown in detail in FIG. 4, may incorporate a first platen 42 connected to an upper plate 44 by means of transverse brackets or connecting plates 46 and 48 so as to be vertically reciprocable through the action of a pneumatic sensing head drive cylinder 50 having a depending piston 52 connected to the platen 42.

A further horizontal plate member 54 is connected to the platen 42 through upright plates 56 and 58, so as to form a space therebetween for supporting a plurality of sensor assemblies 60.

In the raised position of the sensing head structure 28 on the upright guide posts 26, on which the structure is supported through the intermediary of guide collars 62 and 64, the bottom surface of the lower plate 54 is spaced at such a distance above the indexing conveyor 18 as to permit the free movement therebetween of the cases C.

Each of the sensor assemblies 60, of which twelve are mounted in the sensing head 28, includes a generally cylindrical casing 70 having a flange portion bolted to the top of the plate 54 through suitable fasteners 72, and is provided with an externally threaded upper end 74 engaged by a threaded closure cap 76 having a central opening therein for adjusting the pressure a spring exerts on a probe, as described hereinbelow.

A vertically displaceable stem 78 includes a lower probe section 80 protruding downwardly beyond the plate 54 through an aperture 82 in the latter, and is normally biased downwardly through the force of a spring 84 within the cylindrical member 70 which acts on the interior end wall of the closure cap 76.

A spring 86 below a further stem 88 extending into the stem portion 78 projects upwardly through an opening 90 formed in platen 42, and includes a horizontal flange portion 92 contacting a pair of contact switches 94 which are supported on the platen 42 through an angle bracket 96 bolted to the platen 42.

The discharge conveyor 20 consists of a pair of parallel conveyor runs 100 and 102, of which run 100 is adapted to receive the cases C with the leakage-tested packages therein from the indexing conveyor 18 subsequent to the testing sequence having been completed by the leakage testing apparatus 10. As shown, the run 100 of the discharge conveyor 20 is in axial alignment with the transport path of the indexing conveyor 18. Located somewhat downstream of the inlet end of the discharge conveyor run 100 are a series of rollers 104 which are adapted to be pivoted from a transverse direction into an angled direction towards run 102 as shown by the conveyor rollers 104. The rollers 106 of the conveyor run 102 are in a normally angled direction inclined somewhat away from the axial direction of transport of the conveyor run 100 represented by rollers 108.

The indexing conveyor 18 is adapted to be intermittently advanced through the operation of a drive 110 such as, for example, a drag bar conveyor, carried by chains on each side of the conveyor bed, driven from a suitable drive unit 112, as described in further detail hereinbelow.

The operation of the leakage testing apparatus 10 is substantially as follows:

A series of cases C are advanced in contiguous sequential order onto the infeed conveyor 12 so as to be supported on the rollers 14. In the present instance, each of the cases C contains twelve vacuum-sealed packages of a suitable product, such as coffee, and includes twelve holes cut into the top of each case C, each aperture being in alignment with respectively one of the flexible vacuum-sealed packages contained thereon. The cases C may be constructed of suitable substantially rigid corrugated paperboard, as is well known in the container and carton packaging technology.

At this time, the sensing head drive cylinder 50 is pressure-actuated from a suitable pressure supply source, which may be plant air, although a self-contained compressed-air unit may be employed with a power reduction connection to an air compressor. The air compressor (not shown) consist of a rotary-vane air compressor in order to avoid possible pressure surges and to thereby provide for a steady compressed-air flow to the drive cylinder 50.

At this time, the various power and pressure sources and the drive motors for operating the conveyors, such as motor 112 for the indexing conveyor 18, may be energized to place the leakage testing apparatus into condition for operation. Initially, during the forward feed of the cases C on the rollers 14 of the conveyor 12, in which the cases C are advanced in contiguous contact with each other in the direction of arrow A towards the apparatus 10, a case clamping arrangement consisting of a clamping plate 120 extending parallel along the side of the case may be held in a retracted position away from contact with cases C along guide rods 122 through the action of an air cylinder 124, so as to permit the unhindered conveyance of the cases over the rollers 14 in the direction of arrow A.

At this time, the indexing conveyor 18 of the apparatus 10 is set into motion by means of the drive 110 in that the indexing conveyor is driven by chain from a drive reduction unit which, in turn, is driven by a direct drive coupling from a motor equipped with a clutch brake so as to advance a lead case C into the apparatus for precise positioning of the packages below the indexing head unit 28 as the leading case C breaks the beam of the photocell 30. Concurrently, the clamping plate 120 will be moved inwardly towards the path of movement of the cases C on the conveyor 12 and exert a clamping force against the second or subsequent case C, while relieving line pressure and preventing forward movement of the second case. This will also cause an electrical clutch on the indexing conveyor 18 to energize and to cause the conveyor to move the first or leading case C forwardly until the case blocks the photoelectric cell 32.

At that point, as the first case C is moved clear of the photoelectric cell 30, the case clamping plate 120 is again retracted to permit the second case pushed by the rollers 14 of the infeed conveyor 12 to move forwardly and block the photoelectric cell 30. Consequently, the clamping plate 120 will again move forwardly so as to remove line pressure and prevent the indexing conveyor clutch from energizing until the sensing head structure 28 of the apparatus 10 has completed its leakage testing cycle on the leading case.

Upon the first case C blocking the photoelectric cell 32, the indexing conveyor 18 is stopped while a signal is transmitted to the sensing head arrangement 28 to commence its downward movement toward the case C positioned therebelow. At that point in time during the operation of the apparatus, the first case C is positioned on the conveyor 18 so that the apertures in the top of case are in vertical alignment with the probes 80 of the sensor assemblies 60 on the sensing head arrangement 28. The sensing head arrangement 28 is displaced downwardly along the upright guide rods 26 under the force exerted thereon by the sensing head drive cylinder 50 so as to cause the lower end of the probe 80 to extend through the openings of the case C and to contact the surface of the vacuum-sealed flexible package located below each of the apertures in the case. Inasmuch as each flexible package preferably contains about 12 to 15 inches of vacuum, the product in the package imparts a substantial rigidity thereto. Preferably, each probe section 80 consists of a ⅜ inch diameter pressure rod exerting approximately 25 to 35 pounds of thrust against each package.

At that time, the amber light 38 on the indicator panel 34 will be in a lit condition to signify that the apparatus 10 is in operation.

The spring pressure exerted on each probe 80 is adjustable to provide between 25 to 35 pounds of thrust against each flexible vacuum-sealed package in the case C. After the probes 80 contact each of the packages in the case C (provided by a pressure switch connecting to the air cylinder) and pressure is imparted thereto, usually for about 2 to 4 seconds, if the packages are each in a vacuum-sealed condition signifying that there is no leakage, the rod 28 will be forced upwardly so as to cause one of the switches 94 to indicate that the required vacuum is present within the respective flexible package. If all of the packages in a case have the required vacuum pressure therein, through suitable electrical connection of the switches wherein one of each of the switches of all of the probes being in a series connection, a green light will be activated at 40 indicative that all of the packages are vacuum-tight and that no leakage is in evidence. The pressure switch turns "on (indicated by the amber light) to power the sensing head electrical components, thus facilitating interrogation of the probes and, if a "soft" package is present, a suitable electrical signal will be transmitted to a microprocessor (not shown) so as to correlate with the probe condition. Upon an indication that no leakage can be detected, the head unit 28 will again rise, after dwelling for approximately two to four seconds in the downstroke position, whereupon the indexing conveyor 18 is actuated so as to convey the tested case C onto the run 100 of the discharge conveyor 20. At that time the rollers 104 will be in a parallel position with rollers 108 to continue movement of the case along the roller path 100 for further storage or palletizing with an acceptable product.

In the event that any one, some or all of the flexible packages within a case C which is being leakage tested are "soft", to indicate that a defect is allowing the vacuum to leak out, the probe 80 testing that particular package will continue its downward motion into the case so as to cause one of the switches associated with that probe to transmit a signal to the microprocessor advisory of the presence and location in the case of the defective package. A signal will be transmitted to one of the red light locations 36 on the display panel identifying the location of the particular defective package whereupon, subsequent to the rise of the sensing head structure 28, when the case containing the defective package is transported along the discharge conveyor 20, the rollers 104 will be angled as illustrated in FIG. 3 in order to bias the case with the defective package onto the parallel conveyor run 102 for receiving defective cases.

As the sensing head rises it will contact a "head up" limit switch 130, transmitting a signal to the microprocessor that the test cycle is complete and allowing the indexing conveyor 18 to transport the tested case from its position below the sensing head unit 28 onto the discharge conveyor 20, while concurrently advancing a subsequent case which is positioned on the indexing conveyor immediately adjacent to the sensing head from the infeed conveyor 12 to below the sensing head unit 28.

If desired, concurrent with the detection of defective packages through the visual indication of red lights 36 being activated on the display panel 34, an audio signal may also be triggered to advise an operator of the presence of a case C containing defective or leaky vacuum-sealed flexible packages.

Furthermore, if desired, the probes 80 may incorporate suitable marking devices which will indicate the location of a defective package or packages in a case C being tested in the apparatus 10 to thereby render easier any locating and removal of such packages from a case C.

From the foregoing it thus becomes readily apparent that the present invention provides for an extremely efficient and automatic high speed apparatus and method for testing a plurality of vacuum-sealed flexible package arranged within a case, for the presence of leaking or defective packages.

Although the apparatus 10 is shown as being mounted on casters 26 for positioning intermediate infeed and discharge conveyors 12 and 20, it will be readily apparent to one skilled in the art that the apparatus may be built in permanently between the conveyors to form a part of an entire on-line packaging and testing operation and to provide for the monitoring of any operative defects in the packaging machine in the formation of such sealed packages.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. An apparatus for the continuous, non-destructive testing for leaks in hermetically-sealed flexible packages having an internal vacuum that comprises: conveyor means for sequentially indexing said packages to a predetermined position in said apparatus; resistance sensor means including probes for contacting the packages at said predetermined position; indicator means operatively connected to said resistance sensor means for producing a signal indicative of the extend of vacuum as determined by resistance in each of the packages being contacted by the probes of said resistance sensor means; and means for receiving the tested packages from said apparatus including a discharge conveyor, and a bypass conveyor for selectively receiving said tested packages from said discharge conveyor predetermined by response to said resistance sensor means indicating the presence of a leakage in said packages.

2. An apparatus as claimed in claim 1, said apparatus comprising a stationary frame structure; said indexing conveyor means receiving said packages from an infeed conveyor and positioning said packages within said frame structure; resistance sensing head means mounted on said frame structure above said packages for vertical reciprocation towards and away from said packages, said resistance sensor means including at least one said probe depending downwardly from said resistance sensing head means and being adapted to contact the upper surface of said packages and apply a predetermined pressure thereto at the downstroke of said resistance sensing head means whereby the downward displacement of said probe is limited to a first position responsive to contacting a vacuum-sealed package and extended responsive to contacting a leaking package.

3. An apparatus as claimed in claim 2, said indicator means producing a first signal responsive to the displacement of said probe being limited to said first position indicative of the tested packages being in a vacuum-sealed condition, and producing an alternate second signal responsive to the displacement of said probe to the extended position indicative of the presence of a defective leaking package.

4. An apparatus as claimed in claim 3, comprising color-coded indicator lights representative of said first and second signals providing visual display of the conditions of the respective packages being tested for the presence of leakages.

5. An apparatus as claimed in claim 3, comprising means for generating an auditory alarm signal in response to the detection of a defective package by said resistance sensor means.

6. An apparatus as claimed in claim 2, comprising pressure-actuated drive means mounted on said frame structure for imparting said reciprocatory movement to said resistance sensing head means, said sensing head means being displaced downwardly into contact with said packages being indexed to said predetermined location in said apparatus and being raised upon completion of a package testing sequence.

7. An apparatus as claimed in claim 6, comprising means for maintaining said resistance sensing head means in the downwardly displaced position responsive to said probe detecting a defective leaking package so as to enable identification of said package by an operator.

8. An apparatus as claimed in claim 6, comprising means for precluding downward displacement of said resistance sensing head means during the indexing of said packages to said predetermined package testing location in said apparatus.

9. An apparatus as claimed in claim 8, said downward displacement precluding means comprising a limit switch actuated by said resistance sensing head means in the upwardly raised position of said resistance sensing head means.

10. An apparatus as claimed in claim 2, comprising spring means for biasing said probes into contact with the surface of said package, and pressure-responsive means for detecting the vacuum pressure in said package dependent upon the upward displacement of said probe at the end of the downward movement of said resistance sensing head means against said package.

11. An apparatus as claimed in claim 10, said pressure-responsive means comprising compressed-air actuated limit switch means.

12. An apparatus as claimed in claim 2, wherein a plurality of said packages are arranged within a substantially rigid case, said case having a plurality of apertures each in alignment with respectively one of said packages and facing upwardly towards said resistance sensing head means; and a plurality of said probes being positioned one each in alignment with respectively one of said apertures to facilitate the concurrent leakage testing of said plurality of packages in said container.

13. An apparatus as claimed in claim 1, comprising first means on said apparatus for detecting the presence of packages on said indexing conveyor and causing said packages to be advanced into said apparatus; and second detecting means for stopping the movement of said infeed conveyor and advance of subsequent packages upon said preceding packages being located in said predetermined position for leakage testing of the packages.

14. An apparatus as claimed in claim 13, said first and second detecting means each comprising photoelectric cells.

15. An apparatus as claimed in claim 13, comprising clamping means on said infeed conveyor for preventing advance of the subsequeht packages on said conveyor upon said first detecting means detecting the presence of the preceding package on said conveyor; and clutch means activating the indexing conveyor of said apparatus for advancing said preceding package into the leakage testing position and stopping movement of said indexing conveyor upon said second detector means detecting the correct positioning of said packages below the resistance sensor means.

16. An apparatus as claimed in claim 1, said discharge conveyor comprising a roller conveyor having a plurality of parallel spaced rollers for transporting the tested packages from said apparatus; and means for angling the axes of rotations of a section of said roller conveyor for shunting defective packages onto said bypass conveyor.

17. A method for the continuous non-destructive testing for leaks in hermetically-sealed flexible packages having an internal vacuum; comprising sequentially indexing said packages to a predetermined position; contacting the packages with resistance sensing probes at said predetermined position; producing a signal indicative of the vacuum in each of the packages being contacted by said resistance sensing probes; and advancing the tested packages from said testing position, including diverting tested packages responsive to a signal indicative of the presence of a leakage in said packages.

18. A method as claimed in claim 17, comprising contacting the upper surfaces of said packages at a predetermined pressure with said probe to limit movement of said probe to a first position responsive to contacting a fluid-tight package and to an extended position upon contacting a leaking package.

19. A method as claimed in claim 18, comprising producing a first signal responsive to the displacement of said probe being limited to said first position indicative of the tested packages being in a vacuum-sealed condition, and producing an alternate second signal responsive to the displacement of said probe to the extended position indicative of the presence of a defective leaking package.

20. A method as claimed in claim 19, comprising actuating color-coded indicator lights representative of said first and second signals for visual display of the conditions of the respective packages being tested for the presence of leakages.

21. A method as claimed in claim 19, comprising generating an auditory alarm signal in response to the detection of a defective package.

22. A method as claimed in claim 17, comprising detecting the presence of packages and causing said packages to be advanced for leakage testing; and terminating advance of subsequent packages upon said preceding packages being located in a predetermined position for leakage tested of the packages.

23. A method as claimed in claim 22, comprising preventing advance of subsequent packages responsive to detecting the presence of the preceding packages at said testing position; activating an indexing conveyor for advancing said preceding packages into said predetermined package testing position and stopping movement of said indexing conveyor upon detecting the correct positioning of said packages at said testing position.

* * * * *